United States Patent
Voet et al.

(10) Patent No.: US 9,366,021 B2
(45) Date of Patent: Jun. 14, 2016

(54) ARTICLE OF MANUFACTURE MADE OF COMPOSITE MATERIAL, FOR INCORPORATION INTO A CIVIL ENGINEERING STRUCTURE

(71) Applicants: Hans Voet, Hulshout (BE); Leopold Leitner, Feldkirchen an der Donau (AT)

(72) Inventors: Hans Voet, Hulshout (BE); Leopold Leitner, Feldkirchen an der Donau (AT)

(73) Assignees: Hans Voet, Hulshout (BE); Leopold Leitner, Feldkirchen an der Donau (AT)

( * ) Notice: Subject to any disclaimer, the term of this patent is extended or adjusted under 35 U.S.C. 154(b) by 127 days.

(21) Appl. No.: 14/352,515

(22) PCT Filed: Oct. 19, 2012

(86) PCT No.: PCT/EP2012/070829
§ 371 (c)(1),
(2) Date: Apr. 17, 2014

(87) PCT Pub. No.: WO2013/057299
PCT Pub. Date: Apr. 25, 2013

(65) Prior Publication Data
US 2014/0242863 A1   Aug. 28, 2014

(30) Foreign Application Priority Data
Oct. 19, 2011   (EP) ..................................... 11185832

(51) Int. Cl.
*E04B 1/38*   (2006.01)
*E01C 11/10*   (2006.01)
*B29C 70/02*   (2006.01)
*E01C 11/06*   (2006.01)

(52) U.S. Cl.
CPC ................. *E04B 1/38* (2013.01); *B29C 70/021* (2013.01); *E01C 11/10* (2013.01); *E01C 11/06* (2013.01); *Y10T 403/21* (2015.01); *Y10T 442/20* (2015.04)

(58) Field of Classification Search
CPC .......... E04B 1/38; B29C 70/021; E01C 11/10
USPC ........................................................ 428/57
See application file for complete search history.

(56) References Cited

U.S. PATENT DOCUMENTS

| | | | |
|---|---|---|---|
| 3,406,724 A | 10/1968 | Carlstrom et al. | |
| 4,098,047 A | 7/1978 | Weber | |
| 6,177,179 B1 * | 1/2001 | Schock et al. | ............... 428/218 |

FOREIGN PATENT DOCUMENTS

| | | | | |
|---|---|---|---|---|
| DE | 195 35 158 A1 | 3/1997 | | |
| FR | 2 710 875 A1 | 4/1995 | | |
| FR | 2710875 A1 * | 4/1995 | ............. | B32B 23/06 |
| JP | 2007-32057 A | 2/2007 | | |

* cited by examiner

Primary Examiner — Brent O'Hern
(74) Attorney, Agent, or Firm — Sughrue Mion, PLLC

(57) ABSTRACT

An article of manufacture is disclosed for incorporating into a civil engineering structure, for example a concrete structure, such as a floor. The article comprises a substantially fully cured thermosetting polymer resin and a particulate aggregate material having a Mohs hardness of from 3 to 9, preferably from 5 to 8. The article optionally comprises a reinforcing fiber.

The hardness of the article can be closely matched to that of the surrounding structure. The article can be ground with a diamond tool to form a smooth transition with the surrounding structure.

The article is particularly suitable for incorporation into an exposed surface of the structure.

20 Claims, 3 Drawing Sheets

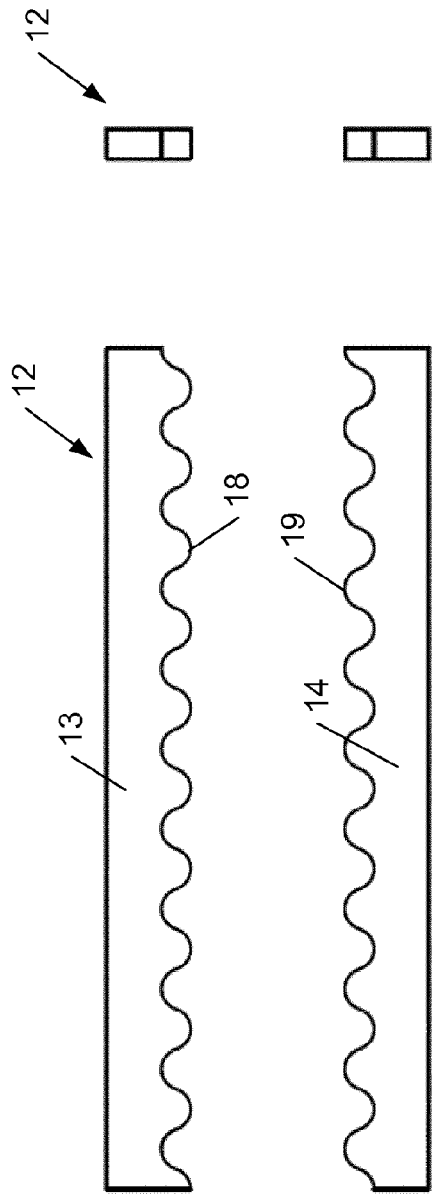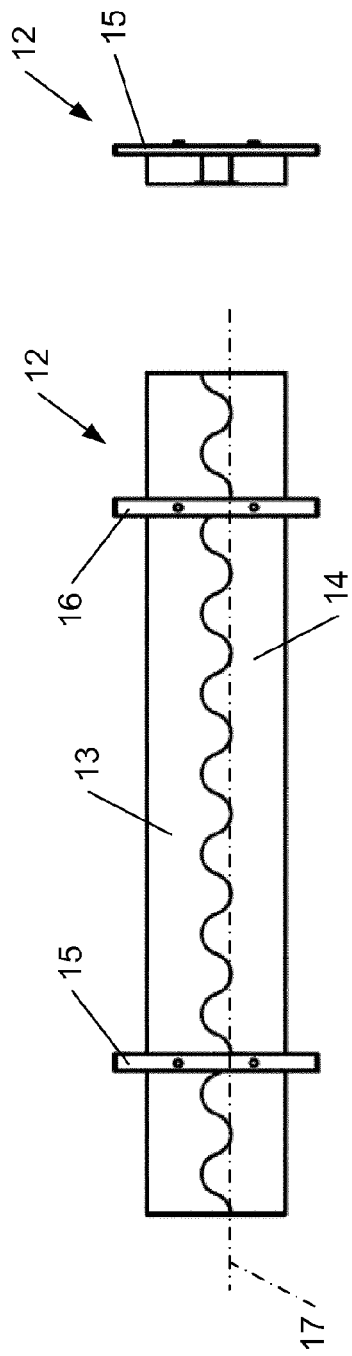

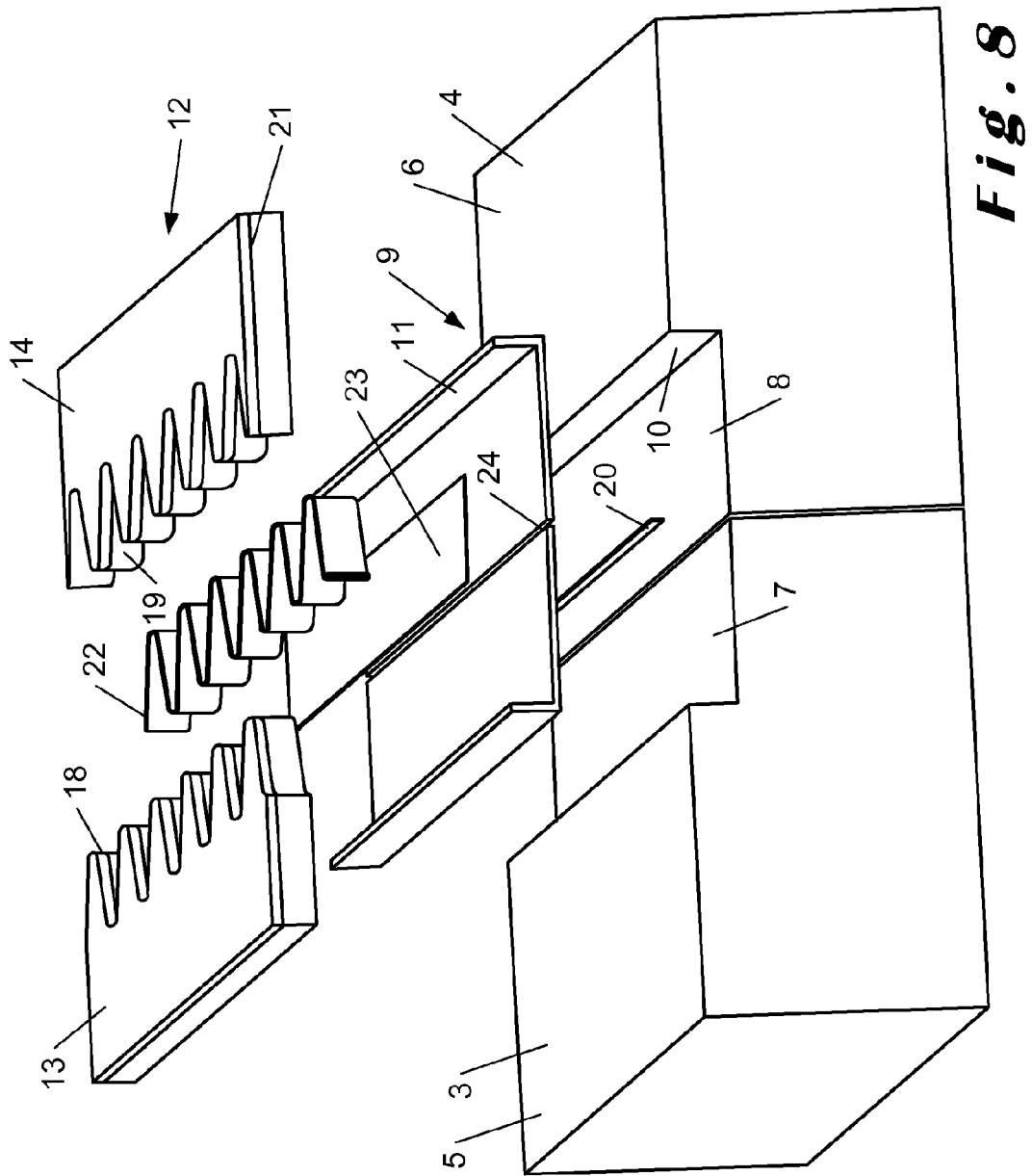

ARTICLE OF MANUFACTURE MADE OF COMPOSITE MATERIAL, FOR INCORPORATION INTO A CIVIL ENGINEERING STRUCTURE

CROSS REFERENCE TO RELATED APPLICATIONS

This application is a National Stage of International Application No. PCT/EP2012/070829, filed on Oct. 19, 2012, which claims priority from European Patent Application No. 11185832.0, filed on Oct. 19, 2011, the contents of all of which are incorporated herein by reference in their entirety.

BACKGROUND OF THE INVENTION

1. Field of the Invention

The invention relates generally to articles of manufacture that are made of a composite material and suitable for incorporation into a civil engineering structure, and more particularly to such articles suitable for incorporation into concrete structures, in particular concrete floors.

2. Description of the Related Art

Construction materials such as concrete and asphalt bitumen have found wide application in civil engineering projects, for example buildings, roads, bridges, levies, and the like. These construction materials can be poured on site and, upon curing or hardening, form a structure having desirable properties in terms of hardness and tensile strength.

There is a frequent need for incorporating into such structures a secondary structure of a foreign material. Examples include expansion joints, cable gutters; drain gutters; floor gullies; floor trays; utility covers; edge reinforcements; man holes; man hole covers; and the like. In many cases these secondary structures are made of metal, in particular steel.

Secondary structures made of metal suffer from a number of serious disadvantages. Metals are subject to corrosion, in particular when exposed to moisture. The corrosion problem is aggravated by exposure of the metal to salt. Exposure to salt is generally unavoidable, as salt is naturally present in the construction material, in particular in concrete. Exposure to salt may also be inherent to the normal use of the engineering structure. For example, roads and parking garages are exposed to road salt used for deicing.

Another drawback of metal is poor adherence to the construction material, in particular if the construction material is concrete. In addition, the mechanical properties of metal, such as tensile strength, surface hardness and thermal expansion, are very different from the mechanical properties of the construction material. These differences result in the development of gaps at the interface of the construction material and the metal. These gaps present areas of weakness in the structure, as the construction material is partially unsupported in these areas. Chipping of the construction material is likely to occur, which results in a widening of the gap, which results in additional chipping, etc.

Standing water tends to collect in the gaps between the construction material and the metal. Freeze/thaw cycles cause further deterioration of the construction material.

Yet another problem is caused by the fact that a poured structure is not perfectly flat; the surface of such a structure can be described as slightly undulating. The metal structure, by contrast, presents a nearly perfect straight edge. This similarity in surface topology is undesirable, as it causes yet another occasion of excessive wear. It would be desirable to grind the construction material/metal interface to macroscopic smoothness, but no grinding tools exist that are suitable for grinding both construction materials such as concrete and asphalt bitumen as well as metals.

Thermosetting polymer formulations are sometimes used for repairing joints between slabs of poured construction materials. By nature, these materials are significantly more corrosion resistant than metals, and also adhere better to the construction material. The polymer formulations are generally formulated to retain a degree of elasticity, to compensate for shrinkage and expansion of the structure.

These polymer formulations are inferior to the construction material in terms of strength and hardness. As a result, expansion joints made of these materials do not provide full support to the surrounding structure, so that chipping of the construction material is not adequately prevented. Expansion joints made with these materials wear out more quickly than the surrounding structure, so that they need to be replaced several times during the life of the structure. These expansion joints cannot be ground with a tool suitable for grinding the construction material. Moreover, these polymer formulations are unsuitable for secondary structures other than expansion joints, such as cable gutters; drain gutters; floor gullies; floor trays; utility covers; edge reinforcements; man holes; man hole covers; and the like.

Thus, there is a need for articles of manufacture that are suitable for incorporation into a civil engineering structure having mechanical properties that are closely matched with the mechanical properties of the engineering structure.

There is a further need for such articles that are corrosion resistant.

There is yet a further need for such articles that can be ground with a tool that is suitable for grinding the material of the civil engineering structure.

BRIEF SUMMARY OF THE INVENTION

The present invention addresses these problems by providing an article of manufacture for incorporation into a civil engineering structure, which article prior to incorporation into the civil engineering structure comprises a substantially fully cured thermosetting polymer resin, and a particulate aggregate material having a Mohs hardness in the range of from 3 to 9, preferably in the range of from 5 to 8.

Another aspect of the invention comprises a civil engineering structure having incorporated therein an article of manufacture comprising a thermosetting polymer resin that was substantially fully cured prior to incorporating the article into the civil engineering structure; and a particulate aggregate material having a Mohs hardness in the range of from 3 to 9, preferably in the range of from 5 to 8.

BRIEF DESCRIPTION OF THE DRAWING FIGURES

FIG. 6a shows a top exploded view of a preferred embodiment of the expansion joint element according to the current invention.

FIG. 6b shows a side view of a preferred embodiment of the expansion joint element of FIG. 6a.

FIG. 7a shows a top view of a preferred embodiment of the expansion joint element of FIG. 6a.

FIG. 7b shows a side view of a preferred embodiment of the expansion joint element of FIG. 7a.

FIG. 8 shows an exploded view of a preferred embodiment of the expansion joint according to the present invention.

DETAILED DESCRIPTION OF THE INVENTION

Figure 1:
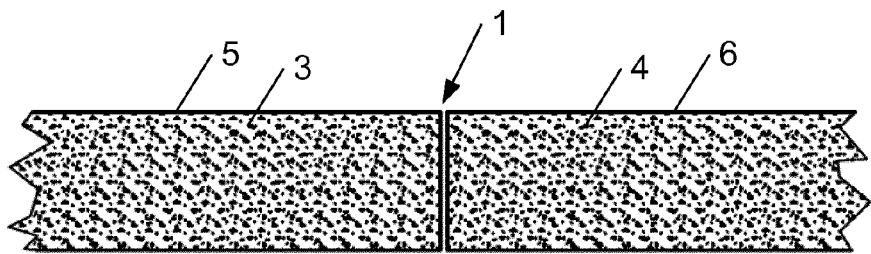
FIG. 1-5 show the different steps of a preferred embodiment of the method according to the invention.

The following is a detailed description of the invention.

DEFINITIONS

The term "civil engineering structure" as used herein means any man-made structure, the construction of which is generally considered the domain of the discipline of civil engineering, and includes such structures as buildings, highways, bridges, viaducts, tunnels, mine shafts, dams, levies, and the like, as well as components of such structures, such as roofs, floors, walls, road decks, pillars, ceilings, and the like.

The term "concrete" as used herein means any building material comprising cement, an aggregate, and water. The composition optionally comprises additional materials, as are well known in the industry. The term compasses the mixture in its pourable, unhardened form as well as in its cured or hardened form. Hardening of pourable concrete involves chemical reactions between the components, as well as partial evaporation of the water component.

The term "concrete structure" refers to a structure made of concrete in its hardened form.

The term "aggregate" is used in the meaning that is common in the concrete industry. Examples include gravel; diluvial sand; quartz sand; feldspar; basalt; granite; and the like.

The term "thermosetting polymer resin" refers to the class of polymers that harden upon curing. Curing generally involves a cross-linking reaction. Cross-linking may occur directly between polymer chains present in the resin, or may occur between polymer chains and a cross-linking agent that is added to the resin for this purpose. Curing may be carried out under ambient conditions, with or without a catalyst, or may require raising the temperature above ambient. Curing may or may not comprise evaporation of a solvent that may be present in the resin.

Thermosetting polymer resins are well known in the art. Examples include polyester resins; epoxy resins; vinyl ester resins; phenolic resins; polyurethane resins; polyaspartic acid ester resins (in particular polyaspartic urea ester resins); and combinations thereof.

The term "substantially fully cured" as used with reference to thermosetting polymer resins refers to such resins wherein the cross-linking reaction is substantially complete. The skilled person will recognize that the resin may not be fully cured at a molecular level, in the sense that cross-linkable moieties may still be present in the resin. The resin is considered substantially fully cured when it has reached at least 90% of its ultimate hardness. The resin is also considered substantially fully cured after it has been exposed to curing conditions and a curing time recommended by the manufacturer of the resin.

In one aspect the invention provides an article of manufacture for incorporation into a civil engineering structure, which article prior to incorporation into the civil engineering structure comprises a substantially fully cured thermosetting polymer resin, and a particulate aggregate material having a Mohs hardness in the range of from 3 to 9, preferably in the range of from 5 to 8.

The civil engineering structure can be a poured structure. It may be poured on-site, or it may be poured off-site and transported to the building site in a hardened form. The civil engineering structure may be made of any suitable construction material. Examples of such materials include asphalt; asphalt/polymer composites, such as Duralith® and Latexfalt®; asphalt/concrete mixtures; mineral/polymer composites, such as Rheodur® and Rheobond®; epoxy mortars; polymer concrete; bitumen and concrete. The invention will be further explained with reference to concrete structures, in particular concrete floors. The reader should bear in mind that the invention is not limited to the use in concrete structures, however.

As explained above, the aggregate is of the type as is generally used in concrete formulations. The Mohs hardness scale is a comparative scale, permitting solid materials to be classified for hardness by comparison to standard materials. Limestone has a Mohs hardness of 3; diamond has a Mohs hardness of 10.

The use of a particulate aggregate material in the article of manufacture makes it possible to match the hardness of the article to the hardness of the concrete structure into which the article is intended to be incorporated. The hardness of concrete structures varies from about 3,000 MPa for floors intended for pedestrian traffic only, to 10,000 MPa for nuclear reactors. The hardness of the article of manufacture can be made to match the hardness of any type of concrete by varying the amount and the Mohs hardness of the aggregate.

Generally the aggregate for use in the article of manufacture has a Mohs hardness in the range of 3 to 9. Aggregates having a Mohs harness of less than 3 generally do not sufficiently contribute to the hardness of the article of manufacture. Aggregates having Mohs hardness greater than 9 are generally very expensive, and are difficult or, in the case of diamond impossible, to grind with a diamond tool.

The amount of aggregate material is preferably in the range of from 50% to 90% by weight of the article of manufacture. The mean particle size is preferably in the range of from 0.1 mm to 5 mm. It has been found that quartz sand is particularly suitable for use as the particulate aggregate material. Quartz sand has a Mohs hardness of 7.

It is desirable to match the surface hardness of the concrete structure as closely as possible, but this is not always practical. A manufacturer of articles suitable for incorporation into a concrete structure may want to limit the number of SKUs, for example providing four or 5 different formulations covering the range of expected concrete hardness. In this situation a perfect match between article and concrete will not always be possible. It is generally desirable, however, to match the concrete hardness within 20%, preferably within 10%.

Conversely, the building contractor can match the surface hardness of the concrete structure to that of the article of manufacture, by a judicious selection of concrete formulation and curing conditions.

Optionally the article of manufacture comprises a reinforcing fiber, preferably in the range of from 1 wt % to 10 wt %. It will be understood that the presence of reinforcing fiber contributes to the tensile strength of the article, but not to its surface hardness. Any reinforcing fiber known in the composites industry can be used in the article of manufacture of the present invention. Specific examples include glass fibers; carbon fibers; aramid fibers; and combinations thereof.

The reinforcing fibers can be incorporated into the article in the form of loose fibers, or as a textile web. A web can be woven or nonwoven; non-woven webs can be bonded or non-bonded. Bonded webs can be melt bonded; spun bonded; hydroentangled; needle bonded (such as in felts); etc. Examples of suitable reinforcement materials are described in the booklet "Carbon Fiber-Based Reinforcement Materials for Civil Engineering" from SGL Group, available at http://www.sglgroup.com/export/sites/sglcarbon/_common/downloads/products/product-groups/cm/textile-products/

Carbon_Fiber_Based_Reinforcing_Materials for_Engineering_e.pdf, the disclosures of which are herein incorporated by reference.

Articles of manufacture according to the invention generally belong to one of two classes. One class relates to articles that are intended to become fully embedded within the concrete structure. Examples include cable conduits, drain pipes, and the like. Such articles offer advantages in terms of corrosion resistance, mechanical strength, and compatibility with the concrete in terms of coefficient of expansion, among others.

A second class relates to articles that are intended for incorporation into an exposed surface of the concrete structure. Examples include expansion joints; drain gutters; and the like. In this context the corrosion resistance of the articles is particularly important. For example, when used in floors or roofs, the articles may be exposed to water and dirt. When used in road decks, bridge decks or garage floors the articles may be exposed to road salt; drain gutters in poultry farms and dairy barns are exposed to animal excrements and harsh cleaning solutions; drain gutters in slaughter houses are exposed to body fluids of the slaughtered animals, as well as to disinfecting cleaning fluids; when used in factory floors the articles may be exposed to all manner of harsh fluids, such as acids, brine, alkaline solutions, organic solvents, mineral oils, and the like.

The articles can be embedded within the exposed surface of the concrete structure using conventional adhesives, in particular two-component adhesives such as epoxy glues and polyurethane glues. This forms a tight seal between the article and the structure, leaving no gap in which liquids or dirt might accumulate. Since the coefficient of expansion of the article is similar, or even identical, to that of the concrete structure, the risk of the formation of a gap resulting from thermal expansion is minimized.

Diamond tools can be used for grinding the surface of a concrete structure, such as a floor. Importantly, the article of manufacture is capable of being ground with a diamond tool as well. Material ground off the surface of the article is removed in the form of individual particles, unlike prior art materials, which are elastic and tend to smear the grinding tool with semi-sold resin debris.

For proper grinding it is important that the hardness of the article is within 20%, preferably within 10% of the hardness of the concrete structure. This ensures that both materials grind down at approximately equal rates. If the article is much softer than the surrounding concrete it grinds down much faster than the concrete, resulting in a recess at the location of the article. If the article is much harder than the surrounding concrete, grinding results in the formation of a bulge in the location of the article.

When the hardness of the article is matched to within 20% to the hardness of the surrounding concrete, the grinding results in a smooth transition between the two elements. This smooth transition improves the mechanical durability of the structure, because the article is fully supported by the surrounding concrete, and the edge of the concrete is fully supported by the article. In addition, the smooth transition prevents the build-up of contaminants at the concrete/article interface, and allows for easy cleaning. These advantages are particularly valuable in food processing environments, such as slaughterhouses; cold storage warehouses; breweries; wineries; bakeries; restaurant kitchens; chemical storage buildings; laboratory floors; manufacturing buildings; the electronic, auto and pharmaceutical industries; hospital floors; and the like.

The article of manufacture can be made using any suitable technique for the manufacture of thermosetting polymer articles. Examples of such techniques include extrusion and injection molding. Fiber reinforced articles can be made using techniques known from the composite industry, such as vacuum bagging; lay-up; pultrusion; and the like.

A particularly preferred embodiment of the article of manufacture of the invention is an expansion joint system comprising a first expansion joint element and a second expansion joint element. The first expansion joint element has a first non-linear surface; the second expansion joint element has a second non-linear surface designed to mate with the first non-linear surface.

The two expansion joint elements are mounted in adjoining surfaces of neighboring concrete slabs, so that the two non-linear surfaces mesh into each other. Optionally, and preferably, the two expansion joint elements and the surrounding concrete surfaces are ground with a diamond tool, to create a smooth transition.

The expansion joint elements permit relative movement of the edges of the concrete slabs, for example resulting from shrinkage due to moisture loss and/or temperature changes. The non-linear meshing surfaces ensure that the weight of any traffic crossing the joint is supported as much as possible by both elements of the joint. Thus, the smoothness of the transition and the non-linearity of the matching surfaces ensure a long useful life of both the joint and the surrounding concrete structure.

The non-linear surfaces can have any meshing shapes. For ease of manufacture, repetitive patterns are preferred. For example, the non-linear surfaces may have a generally sinusoidal shape; a generally saw-tooth, in particular truncated saw-tooth shape; and the like.

Another aspect of the invention is a civil engineering structure comprising the article of manufacture. Preferably the civil engineering structure is a concrete structure.

In an embodiment the article of manufacture is dispose din an exposed surface of the structure. Desirably the article and the surrounding structure surfaces have been ground to create a smooth transition. Grinding can be done with a diamond tool.

DESCRIPTION OF ILLUSTRATIVE EMBODIMENTS/EXAMPLES

The following is a description of certain embodiments of the invention, given by way of example only.
Manufacture of an Article According to the Invention.

Sikafloor®-325 Part A (a liquid polyester glycol composition) is mixed with Sikafloor®-325 Part B (diphenylmethandiisocyanate, CAS-Nr. 9016-87-9)) in weight ratio 73:27. The resin components are available from Sika Oesterreich GmbH, Dorfstrasse 23, A-6700 Bludenz, Austria.
The resin mixture is mixed with quartz sand in a resin:sand weigh ratio of about 1:2. The sand has particle size distribution as follows:

| | |
|---|---|
| >1.25 mm | ca. 2.5% |
| 1.0-1.25 mm | ca. 12% |
| 0.5-1.0 mm | ca. 55% |
| 0.25-0.5 mm | ca. 12% |
| 0.125-0.25 mm | ca. 10% |
| 0.063-0.125 mm | ca. 8% |
| <0.063 mm | ca. 0.5% |

The resin:sand ratio can be modified, generally within the range from 1:0.5 bis 1:12 in order to vary the surface hardness of the resulting article, so as to provide a match with the surface hardness of the structure in which the article will be incorporated.

The resin/sand mixture is formed into the desired profile by casting, injection molding, reaction induced molding, or any other suitable molding technique for thermosetting polymers. The article can be cured at ambient temperature. Curing can be accelerated in an oven. After partial curing, when the surfaces of the article are still tacky, the surfaces of the article that come into contact with the structure are dusted with quartz sand, to provide an improved surface for adhesion.

The resulting profile is cut into two expansion joint elements by high pressure water beam (water pressure about 2,500 bar) cutting along the desired non-linear surface (sinusoidal; saw-tooth; etc.). Laser cutting is also possible.

The manufacturing method is modified by adding from 1% to 10% by weight of a reinforcing fiber, for example glass fibers, aramid fibers, or carbon fibers. If the article is intended to be incorporated into an exposed surface of a structure it is desirable to leave the exposed surface of the article substantially fiber-free, so that the reinforcement fibers do not interfere with a subsequent grinding step. The fibers may be loose fibers, or may be in the form of a web or a fabric, as described in more detail hereinabove.

Any method for forming fiber-reinforced thermosetting polymer articles can be used, including but not limited to vacuum bagging; lay-up; pultrusion; and the like. The fiber may be used dry, or may be pre-wetted with the polymer resin.

The above manufacturing method is modified by using an alternate aggregate material in lieu of quartz sand. Examples include basalt chips; gravel; glass beads; limestone chips; and the like.

The manufacturing is modified further by using an alternate thermosetting polymer in lieu of polyurethane. Examples include epoxy, PMMA, and the like.

Installation of an Expansion Joint in a Concrete Floor

The installation of a floor joint system will be described with reference to the figures, in which:

1 expansion joint to be replaced
2 replaced expansion joint or subsequent expansion joint
3 first slab
4 second slab
5 first upper surface
6 second upper surface
7 first further upper surface
8 second further upper surface
9 joint volume
10 upright side walls
11 resin mortar
12 expansion joint system
13 first expansion joint element
14 second expansion joint element
15 first cross suspension element
16 second cross suspension element
17 longitudinal direction
18 first cooperating edge
19 second cooperating edge
20 sealing member
21 reinforcing fibre
22 joint sealing member
23 tape
24 longitudinal opening in resin mortar 11

FIG. 1 shows a side view of a cross-section of two adjacent concrete slabs, a first concrete slab 3 and a second concrete slab 4. An expansion joint 1 is present in between the first concrete slab 3 and the second concrete slab 4. Although the expansion joint shown is in the form of a space between the first 3 and the second 4 concrete slabs, this is not critical for the invention and a wide array of expansion joints known to the person skilled in the art can be replaced by the method according to the invention.

The first 3 and the second 4 concrete slabs can be any type of concrete slab. For example, the concrete slabs 3, 4 are concrete floor slabs, for example, floor slabs 3, 4 can be of the kind exposed to many of vehicles driving over it, such as for example concrete floor slabs 3, 4 of a garage, a storage warehouse, etc.

Figure 2:
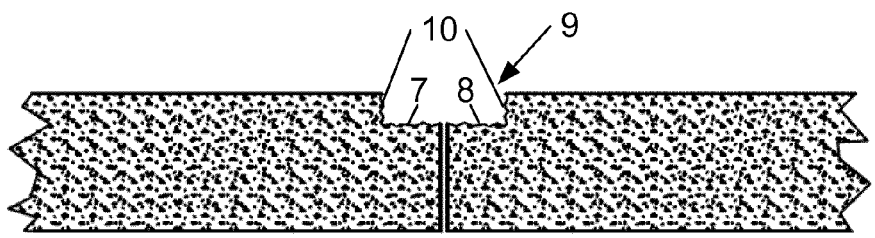

In a first step, shown in FIG. 2, part of the adjacent upper surfaces 5, 6 of the slabs at the location of the expansion joint 1 to be replaced is removed. The parts are delimited at one of their sides by the expansion joint 1. Preferably, a longitudinal part located along and adjoining the expansion joint 1 is removed, for example in the shape of rectangles delimited at one of their longitudinal sides by the expansion joint 1. Other embodiments, depending on the shape and dimensions of the expansion joint 1 are however possible. Although FIG. 2 shows that substantially equal parts of the adjacent upper surfaces 5, 6 are removed, this is not critical for the invention and also, for example substantially unequal parts of the adjacent upper surfaces 5, 6 can be removed, for example by cutting through the concrete of the concrete slabs 3, 4.

By removing part of the adjacent upper surfaces 5, 6 of the slabs at the location of the expansion joint 1 to be replaced, further adjacent upper surfaces 7, 8 below the initial upper surfaces are created in the adjacent slabs. The further adjacent upper surfaces 7, 8 are shown in FIG. 2. Although the further adjacent upper surfaces 7, 8 are shown as coplanar surfaces, being relatively easy to make by cutting through the concrete of the slabs 3, 4, this is not critical for the invention and the further adjacent upper surfaces can also be applied at different heights or even non-parallel to each other, depending on the nature of the concrete slabs 3, 4, the desired configuration depending on for example the application, etc.

A joint volume 9 is created in the adjacent slabs 3, 4. The joint volume 9 is delimited by upright side walls 10 extending from the further adjacent upper surfaces 7, 8 and the upper surfaces 5, 6. The upright side walls 10 can be any type of side walls 10 and can, as shown in FIG. 2, be in the form of walls 10 substantially perpendicular to the further upper surfaces 7, 8. This is however not critical for the invention and the walls 10 can also be under a different angle with respect to the further upper surfaces 5, 6, for example an oblique angle or an acute angle. Although the joint volume 9 shown in FIG. 2 is shown as a rectangle, this is not critical for the invention and other shapes are possible depending on for example the application.

Figure 3:
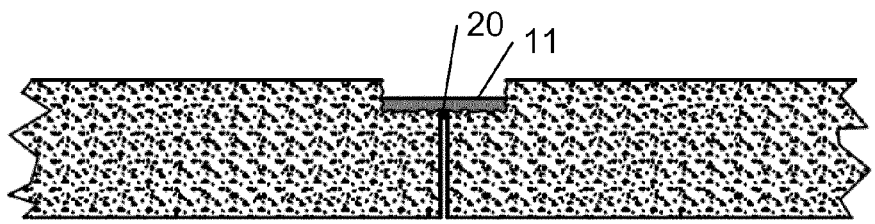

Preferably, as shown in FIG. 3, in a next step a sealing member 20 is positioned between the two adjacent slabs 3, 4. Preferably, the sealing member 20 is dimensioned such that it will tightly fit in between the slabs 3, 4, sealing the part of the expansion joint 1 below the sealing member 20 from parts put above the sealing member 20 and keeping its place in between the two slabs 3, 4. Preferably, the sealing member 20 is made of an elastic material such that when the slabs 3, 4 move with respect to each other, the sealing member 20 retains its place and integrity. The sealing member 20 for example is an elastomer, for example a thermoplastic elastomer, an acrylonitrile-butadiene (NBR) rubber or a butyl rubber, possibly comprising fibers such as for example polyester fibers possible knitted. Member 20 extends in the space between the first slab 3 and the second slab 4. To decrease the risk that the sealing member 20 moves from its intended location between the slabs 3 and 4, the sealing member 20 can be glued to one or even both of the slabs 3, 4.

As shown in FIG. 8, the sealing member 20 preferably extends to above the further upper surfaces 7, 8. The sealing member 20 thereto preferably comprises a first longitudinal part provided for being inserted in between the two adjacent slabs 3, 4 and a second longitudinal part, provided to extend above the further upper surfaces 7, 8 when inserted in between the two adjacent slabs 3, 4.

Preferably, in a next step a primer layer is applied such that when in the subsequent step the resin mortar 11 is applied, the primer layer is in between the concrete of the concrete slabs 3, 4 and the resin mortar 11.

In a next step, resin mortar 11 is applied onto the further adjacent upper surfaces 7, 8. This step is also shown in FIG. 3. Although FIG. 3 shows the resin mortar applied to substantially the entire surface of the further upper surfaces 7, 8, this is not critical for the invention. The resin mortar 11 can be applied to only part of the further upper surfaces 7, 8. However, it has been found that a full application offers an improved attachment of an expansion joint element 12, which will be applied in a later step.

Preferably, the resin mortar 11 is applied such that, when the expansion joint system 12 is positioned in the joint volume 9, the resin mortar 11 is pushed at least partly in between the first and the second expansion joint elements 13, 14, and the respective upright side walls 10 of the first and second slabs 3, 4. The result is for example illustrated in FIG. 4. This is however not critical for the invention and other embodiments are possible, such as for example applying the resin mortar 11 such that it is not pushed in between the expansion joint element and the upright side walls 10 but, instead, stays under the expansion joint system 12.

FIG. 8 shows that the resin mortar 11 is pushed at least partly in between the first and the second expansion joint elements 13, 14, and the respective upright side walls 10 of the first and second slabs 3, 4. Further it is shown that the preferred second longitudinal part has created a longitudinal opening 24 in the resin mortar 11. It has been found that the presence of the opening 24 allows a better movement of the slabs with respect to each other, increasing the predictability of the movement of the slabs 3, 4.

In order to apply a predetermined volume of mortar in the joint volume 9, for example the mortar is applied with a predetermined thickness. The thickness for example is determined by sliding a depth determining element along the applied mortar in the joint volume 9 such that excess mortar is for example scooped and/or pushed away. This element for example is in the form of a trowel having an edge provided to be moved over and in contact with the upper surfaces 5, 6 of the first or the second slab 3, 4 such that another part of the trowel scoops away or pushes away excess mortar.

Figure 4:
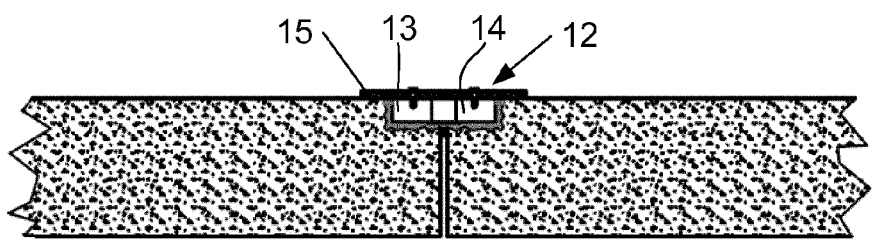
Figure 5:
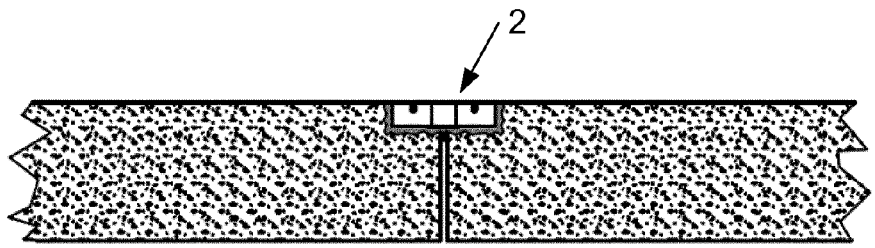

After application of the resin mortar 11, the first expansion joint element 13 and the second expansion joint element 14 of expansion joint system 12 are positioned in the joint volume 9, with the first part 13 of the expansion joint system 12 extending along the first slab 3, and the second part 14 of the expansion joint system 12 extending along the second slab 4, such that an expansion joint 2 is created at least partly replacing the previous expansion joint 1. This is shown in FIG. 4 in which an expansion joint system 12 is shown applied in the joint volume 9. The resulting subsequent expansion joint 2 is shown in FIG. 5.

Preferably, for example shown in FIG. 8, tape 23 has been applied to the expansion joint covering the first and the second cooperating edge such as to avoid that for example mortar enters in between the first and the second cooperating edge, possibly hampering the functionality of the expansion joint. Preferably, the tape 23 is adhered less strongly to the expansion joint than to the resin mortar, for example when dry, such that after installation of the expansion joint, the tape 23 releases the expansion joint and adheres to the mortar such that the risk that the tape 23 hinders the functionality of the expansion joint is further reduced.

Preferably, the tape 23 is dimensioned such as to avoid the resin mortar 11 from attaching with the cooperating edges and thereto for example extends between the cooperating edges 18, 19 and the resin mortar 11. Such configuration has been found to decreases the risk that the movement of the first and the second expansion joint elements 13, 14 are hampered and thus increases, for example, the predictability of the movement of the slabs 3, 4.

Although it is shown that the upper surface of the expansion joint system 12 is substantially coplanar with the upper surfaces 5, 6 of the slabs 3, 4, this is not critical for the invention and the expansion joint system 12 can also, for example, protrude at least partly from the slabs 3, 4. However, when the expansion joint system 12 is applied such that its upper surface is substantially coplanar with the upper surfaces 5, 6 of the slabs 3, 4, the surface of the slabs 3, 4 and the resulting expansion joint 2, offers a surface with an improved flatness, for example resulting in less damage to the slabs 3, 4 and/or the expansion joint 2 when for example vehicles drive over the expansion joint 2.

To further improve the flatness of the slabs 3, 4 in combination with the expansion joint 2, preferably, although not shown in the figures the subsequent expansion joint 2 is ground such that unevennesses, for example arising from a subsequent expansion joint 2 protruding from the slabs 3, 4, are reduced or even removed. It is an important aspect of the present invention that expansion joint system 12 can be ground with a tool, such as a diamond tool, that is customarily used for grinding concrete. Another important aspect is that grinding is also possible at a later time, as may become necessary if the concrete floor suffers from shrinkage upon aging.

As an alternative to grinding the expansion joint 2, or in addition to grinding the expansion joint 2, the expansion joint system 12 preferably comprises at least one cross suspension element 15 which, when the expansion joint system 12 is placed in the joint volume 9, extends over the upper surfaces 7, 8 of the first and the second slab 3, 4 along a direction perpendicular to the longitudinal direction 17 of the expansion joint 1, and suspends the elements 13, 14 of expansion joint system 12 such that the upper surfaces of the expansion joint elements 13, 14 become substantially coplanar with the upper surfaces 7, 8 of the slabs 3, 4, The cross suspension elements 15 are removed after attachment of the expansion joint system 12 to the slabs 3, 4 by the resin mortar 11 such that the upper surfaces of the expansion joint elements 13, 14 remain substantially coplanar with the upper surfaces of the slabs 3, 4 upon creation of the expansion joint 2. The configuration of the expansion joint system 12 in the joint volume 9 is shown in FIG. 4.

The expansion joint system 12 comprising the first and the second expansion joint elements 13, 14 is for example shown to more detail in FIGS. 6a and 6b. As can be seen, the first and the second expansion joint elements 13, 14 comprise respectively a first and a second cooperating edge 18, 19 lying substantially along the extending direction of the expansion joint 2. Although first and the second expansion joint elements 13, 14 are shown to be sinusoidal, this is not critical for the invention and other non-linear surfaces are also possible, such as for example triangular; zig-zag; interlocking truncated cones; etc.

FIG. 8 for example shows that reinforcing fibers 21 are incorporated into the article, more particular in the form of loose fibers, or as a textile web even more particular in a single layer.

FIGS. 7a and 7b show the two expansion joint elements 13, 14 after installation, with the two cooperating edges 18, 19 interlocked.

Although not critical for the invention, in between the first and the second expansion joint elements 13, 14 a joint sealing member 22 can be applied to avoid material from entering the space in between the first and the second expansion joint elements 13, 14. The joint sealing member 22 preferably is provided such as to sufficiently fill up the space in between the first and the second expansion joint elements 13, 14 on the one hand but nevertheless allow the first and the second expansion joint elements 13, 14 to move towards and away from each other. Thereto the joint sealing member 22 preferably is elastically compressible along moving direction of the first and the second expansion joint elements 13, 14. As shown in FIG. 8, the joint sealing member 22 is a longitudinal element extending along the cooperating edges 18, 19.

As can also be seen in FIG. 7a, more than one cross suspension element 15, 16 is present. Although not shown, for example depending on the length of the expansion joint system 12, a single cross suspension element 15 may be sufficient, or more than two cross suspension elements 15, 16 may be present. The number of cross suspension elements 15 can be determined by the person skilled in the art, depending on, for example, the application in which the expansion joint system 12 will be employed.

Importantly, the expansion joint system can be coated with any customary floor coating, for example epoxy-based or polyurethane-based floor coatings.

Thus, the invention has been described by reference to certain embodiments discussed above. It will be recognized that these embodiments are susceptible to various modifications and alternative forms well known to those of skill in the art. For example, the article of manufacture may be modified by modifying the nature of the thermosetting polymer resin; by modifying the hardness, the amount and the particle size of the aggregate; by the optional use of reinforcing fibers; by the amount and nature of the reinforcing fiber; and by the form in which the reinforcing fiber is incorporated.

Many modifications in addition to those described above may be made to the structures and techniques described herein without departing from the spirit and scope of the invention. Accordingly, although specific embodiments have been described, these are examples only and are not limiting upon the scope of the invention.

What is claimed is:

1. An expansion joint system for incorporation into a concrete structure, the expansion joint system, prior to incorporation into the concrete structure, comprising:
    a substantially fully cured thermosetting polymer resin,
    a particulate aggregate material having a Mohs hardness in the range of from 3 to 9, and
    a first expansion joint element and a second expansion joint element, the first expansion joint element having a first non-linear surface, and the second expansion joint element having a second non-linear surface configured to mate with the first linear surface.

2. The expansion joint system of claim 1 wherein the thermosetting polymer resin is selected from the group consisting of polyester resins; epoxy resins; vinyl ester resins; phenolic resins; polyurethane resins; polyaspartic urea ester; and combinations thereof.

3. The expansion joint system of claim 1 further comprising a reinforcing fiber, selected from the group consisting of glass fibers; carbon fibers; aramid fibers; and combinations thereof.

4. The expansion joint system of claim 3 wherein the reinforcing fiber is in the form of loose fibers; a woven web; an unbonded non-woven web; a bonded non-woven web; a felt; or a combination thereof.

5. The expansion joint system of claim 1 comprising from 40% to 90% by weight of the particulate aggregate material.

6. The expansion joint system of claim 3 comprising from 1% to 10% by weight of reinforcing fiber.

7. The expansion joint system of claim 1 wherein the particulate aggregate material is selected from the group consisting of diluvial sand; quartz sand; feldspar; basalt; granite; glass beads; and combinations thereof.

8. The expansion joint system of claim 1 wherein the particulate aggregate material has a mean particle size in the range of from 0.1 mm to 5 mm.

9. The expansion joint system of claim 1 for incorporation into a concrete floor.

10. The expansion joint system of claim 1 having a surface hardness within 20% of a surface hardness of the concrete structure.

11. The expansion joint system of claim 1, wherein the expansion joint system is configured for incorporation into an exposed surface of the concrete structure.

12. The expansion joint system of claim 11, wherein the expansion joint system is configured to be ground with a diamond tool.

13. The expansion joint system of claim 1 wherein the first non-linear surface has a generally sinusoidal shape.

14. The expansion joint system of claim 1 wherein the first non-linear surface has a generally saw-tooth shape.

15. A concrete structure comprising the expansion joint system of claim 1.

16. The concrete structure of claim 15 wherein the expansion joint system is disposed in an exposed surface of the concrete structure.

17. The concrete structure of claim 16 wherein an exposed surface of the expansion joint system and an exposed surface of the concrete structure adjacent to the expansion joint system have been ground to improve surface smoothness.

18. The concrete structure of claim 17 wherein the ground surfaces have been ground with a diamond tool.

19. The expansion joint system of claim 1, wherein the particulate aggregate material has a Mohs hardness in the range of from 5 to 8.

20. The expansion joint system of claim 1, having a surface hardness within 10%, of a surface hardness of the concrete structure.

* * * * *